March 27, 1951     R. R. WILCOX, JR     2,546,574
SPRINKLER VALVE
Filed June 3, 1946
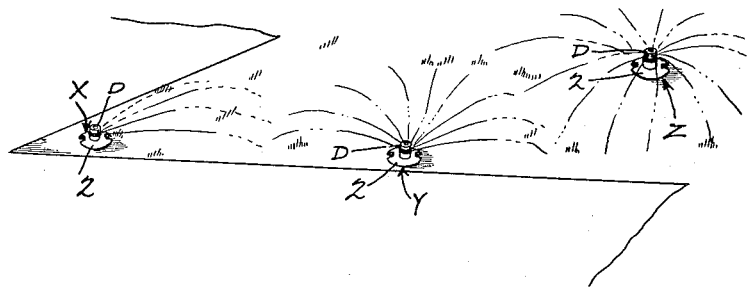
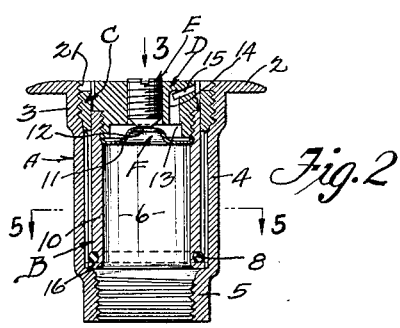
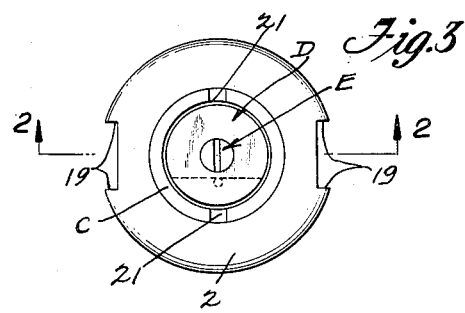
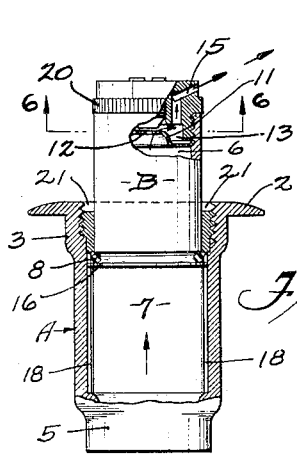
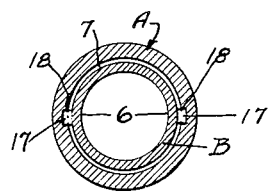
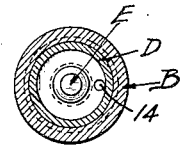
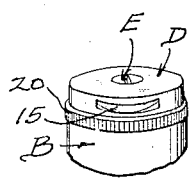
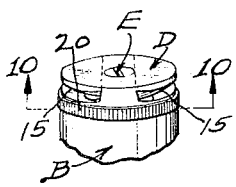
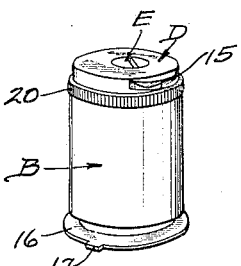
INVENTOR.
RALPH R. WILCOX JR.
BY *[signature]*
Attorney Patented Mar. 27, 1951

2,546,574

UNITED STATES PATENT OFFICE 2,546,574

SPRINKLER VALVE

Ralph R. Wilcox, Jr., Pasadena, Calif., assignor to C. B. Mulholland, Jr., South Pasadena, Calif.

Application June 3, 1946, Serial No. 673,912

2 Claims. (Cl. 299—61)

This invention relates to and has for an object the provision of an improved sprinkler valve of the well known "pop-up" type which is adapted to be installed in lawn sprinkling systems and peculiarly adapted for directing a spray of water in desired directions, as for example, at corners of a lawn, a margin thereof and in a central portion, in order that water will not be sprayed on sidewalks or other portions of property which would occasion a waste of water. To such end I provide sprinkler units which I designate as "full head," "half head" and "quarter head," all of which are structurally similar except for the fact that the water spray is differently directed in accordance with requirements of use.

A full head unit will spray water in an umbrella-like fashion over a central area of a lawn; a half head unit will direct water in a semicircular path from a point near a margin of the lawn; and a quarter head unit will direct a stream or spray of water from a corner position on a lawn so that the sidewalks adjacent thereto will not be flooded.

An object is to provide a sprinkler unit of any of the aforesaid characteristics which has a tubular body adapted to be submerged in the ground and connected with a source of water supply and a plunger normally seated in the cylinder but adapted, upon application of water pressure thereto, to be elevated to sprinkling position above the top of the submerged cylinder.

A further object is to provide a suitable seal between the wall of the cylinder and the plunger for preventing escape of water around the plunger when it is in use.

Another object is to provide a suitable means in the cylinder for slidably mounting the plunger.

A still further object is to provide means adjustable on the plunger for regulating the stream or spray so that when a plurality of units are employed in a system each unit may be separately adjusted to meet a requirement of its particular position on a lawn.

In the accompanying drawing I have illustrated a sprinkling system employing several units of my invention and of varying characteristics, in which:

Fig. 1 is a perspective view of a lawn sprinkling system arranged for use of which the sprinklers embody my improvements;

Fig. 2 is a typical sectional elevation of a sprinkler unit on line 2—2 of Fig. 3 showing the plunger in lowered position;

Fig. 3 is a top plan view of a unit as viewed in the direction of arrow 3 of Fig. 2;

Fig. 4 is a view similar to Fig. 2 except that the plunger is shown in sprinkling position;

Fig. 5 is a cross section on line 5—5 of Fig. 2;

Fig. 6 is a cross section on line 6—6 of Fig. 4;

Fig. 7 is a perspective view of a half head plunger;

Figs. 8 and 9 are, respectively, partial views in perspective of a quarter head and full head plunger respectively; and Fig. 10 is a cross section on line 10—10 of Fig. 9.

A typical unit embodying my improvements includes a cylinder A, a plunger B extensibly mounted therein, a bushing C insertible in the cylinder and forming a guide for the plunger, a head D detachably secured to the plunger, a valve E carried by the head, and a valve seat member F carried by the plunger and cooperating with the valve for regulating the spray or stream of water from the unit.

Cylinder A is formed with top flange 2, an internally threaded portion 3 for detachably receiving bushing C, an annular skirt 4 in which plunger B is slidably mounted, and an internally threaded inlet portion 5 at its bottom for attachment to an imbedded pipe of a water sprinkling system.

Plunger B is of cylindrical cross section with a chamber 6 therein open at its bottom for constant communication with a chamber 7 of cylinder A (Figs. 2 and 4) so that water admitted through inlet 5 will tend to raise the plunger into sprinkling position as in Fig. 4. The lower end of the plunger is annularly grooved to hold an O ring seal 8 so as to prevent leakage and waste of water around the plunger, while the upper end of the plunger is internally threaded to receive a nipple 9 of head D, between which nipple and an adjacent shoulder of the plunger a sheet metal valve seat F is held in operative position. Head D and skirt 10 of the plunger, are arranged to slide in bushing C.

Valve seat F is held in position between head D and a shoulder provided at the lower end of the internal thread cut in the upper end of the plunger. Seat F has a domed central portion 11 with a central orifice 12 adapted to be opened and closed by adjustment of valve E in the head D so as to regulate the flow of water from chamber 6 to a shallow outlet chamber 13 in the head D. One or more passages 14 are formed in the head for directing a flow of water from chamber 13 outwardly to and from one or more peripheral channels 15 which are so formed as to spread the water to an extent of ninety, one hundred and eighty or three hundred and sixty degrees, depending upon the particular form and arrangement and for providing one-quarter, one-half and full head units. For instance, as shown in Fig. 1, a unit designated at X is a quarter head type; a unit shown at Y is a half head type; and a unit Z is a full head type. All of said units, however, are of the same characteristics except as to the number, extent and form of the outlet channels.

It is necessary that plunger B should be held against rotation in cylinder A, and for such purpose the flange 16 of the plunger is formed with outwardly extended lugs 17 which are adapted to slide in vertical grooves 18 on the inner surface of the cylinder wall. Flange 2 of cylinder A may have wrench receiving notches 19, plunger head D may have a knurled portion 20 and bushing C may have notches 21 (Fig. 3), whereby suitable spanner wrenches may be employed for assembling and disassembling a unit.

Other structural details may be provided to render the sprinkler units adaptable for different uses and under peculiar conditions, without departing from the spirit of the invention as set forth in the appended claims.

When installing the sprinklers it will be obvious that cylinders A will be screwed onto the water pipe so that the sprayed water covers the desired area, the proper form of outlet being installed at each location.

In operation, a system embodying a plurality of interconnected units X, Y and Z (Fig. 1) is usually controlled by a single valve. As water is delivered under pressure to the several units of a system through inlet 5 to chamber 7 the plunger B is forced upwardly to the position shown in Fig. 2. If valve E is seated on member F so as to close orifice 12 no water can flow into chamber 13 and consequently no water can be sprayed from such sprinkler head. Valve E is adjustable relative to member F, however, so as to regulate the flow of water through member F and from head D.

Flange Z is usually positioned at a level slightly below the surface of a lawn so as not to interfere with the operation of a lawn mower, while plunger B is normally depressed to the position shown in Fig. 2 when the sprinkler is not in use and is so designed and mounted in its cylinder that when pressure is relieved in chambers 6 and 7 it will drop by gravity to normally inoperative position in spite of the frictional engagement of seal 8 on the wall of the cylinder A.

I claim:

1. A sprinkler comprising: a tubular body having a water inlet at its lower end, a tubular plunger axially slidable in the body, said plunger being open at its top for receiving water under pressure from said inlet, a closure at the upper end of said plunger having an orifice for emission of water, a bushing detachably secured to the top of the body and forming a guide for the plunger, a head detachably secured to the plunger above said closure and so positioned as to provide a chamber between it and the closure, said head having lateral outlets open at the periphery of the head and in communication with said chamber, and a valve adjustably borne by said head and adjustable relative to and for opening and closing the orifice in said closure, for regulating the discharge of water through said outlets.

2. A sprinkler as characterized in claim 1 in which the outlets of said head are of angular cross section with their outer extremities of greater width than their inner extremities so as to direct water from the head over a substantial area of the surface to be sprinkled.

RALPH R. WILCOX, Jr.

REFERENCES CITED

The following references are of record in the file of this patent:

UNITED STATES PATENTS

| Number | Name | Date |
|---|---|---|
| 1,659,470 | Owen et al. | Feb. 14, 1928 |
| 1,724,662 | Johnson | Aug. 13, 1929 |
| 1,768,919 | Moore | July 1, 1930 |
| 1,790,358 | Tyrrell | Jan. 27, 1931 |
| 2,083,282 | Thompson | June 8, 1937 |
| 2,360,203 | Cox | Oct. 10, 1944 |